United States Patent [19]
Rayfield

[11] Patent Number: 5,784,869
[45] Date of Patent: Jul. 28, 1998

[54] CORN HEAD AUGER TROUGH DIVIDER

[75] Inventor: James F Rayfield, New Holland, Pa.

[73] Assignee: New Holland North America, Inc., New Holland, Pa.

[21] Appl. No.: 792,021

[22] Filed: Jan. 31, 1997

[51] Int. Cl.[6] .................................................. A01F 12/00
[52] U.S. Cl. .......................... 56/119; 56/71; 56/94; 56/DIG. 5; 460/114; 460/119
[58] Field of Search ................. 56/119, 94, DIG. 5, 56/71, 73, 76, 99, 59, 66, 69, 78, 82, 88, 98, 106, 108; 460/114, 119, 901

[56] References Cited

U.S. PATENT DOCUMENTS

| | | | |
|---|---|---|---|
| 3,244,271 | 4/1966 | Wenning | 198/217 |
| 3,503,190 | 3/1970 | van der Lely | 56/23 |
| 3,794,046 | 2/1974 | Muijs | 130/27 T |
| 4,567,717 | 2/1986 | Mantor | 56/119 |
| 4,617,787 | 10/1986 | Eguchi et al. | 56/14.6 |
| 5,724,797 | 3/1998 | Wagstaff et al. | 56/119 X |

*Primary Examiner*—Terry Lee Melius
*Attorney, Agent, or Firm*—Larry W. Miller; J. William Stader; Frank A. Seemar

[57] ABSTRACT

The disclosure relates to a corn head auger crop divider located in the auger trough of a corn head. The divider is positioned between the center row divider and center of the feeder house opening. The divider does not contact the transverse auger and transverse auger flighting. The divider consists of a rear divider partially nested within the front divider. The front divider has a triangularly shaped top region. This orients a pair of side embankments so as to smoothly alter the flow of corn crop. In operation, the corn ears are pushed into the auger trough by the gathering chains within the row divider. The transverse auger pushes the corn crop to the center of the corn head where it contacts the side embankment of the front divider. The side embankment changes the direction of the corn crops flow so that it is directed into the feeder house opening.

17 Claims, 5 Drawing Sheets

CORN HEAD AUGER TROUGH DIVIDER

BACKGROUND OF INVENTION

1. Field of Art

This invention relates to the improvement of machines used in the harvesting of corn. More particularly, it relates to an auger trough divider on a corn head of a twin rotor harvesting combine.

2. Description of Prior Art

Mechanical harvesting of corn has taken place for decades. However, efforts continue in the attempt to make corn harvest operations more efficient and effective. A corn harvester generally includes a corn head which removes the ears from the stalks. The ear of corn is then fed into a separator or thresher which separates the grains of corn from all other materials. A corn head actually consists of several row assemblies, one for each row which is being harvested in a single pass over the field. Typically each divider covers a pair of stalkrolls, stripper plates, gathering chains and gear boxes. After the stalkroll and stripper plate removes the ear from the cornstalk, the gathering chain lifts and pushes the ear into the auger trough of the corn head. Typically, the trough is contoured to receive a larger quantity of corn ears. Above the trough of the corn head is a transverse auger. Affixed to the auger are two sets of helical flightings. A left-handed flighting pushes the corn in the trough from the left side of the corn head to the center of the corn head. A right-handed flighting pushes the corn in the trough from the right side of the corn head to the center of the corn head. Located at the center of the corn head is the opening to the elevator or feeder house. The corn ears are forced into the feeder house opening. The feeder house lifts the ears into the threshing and separation areas of the combine. The corn is separated from the ear and husk by a rotor.

Currently, there are several drawbacks to the conventional corn head. Specifically, it is difficult to re-orient the flow of the corn travelling in an auger trough. After the gathering chain places the corn crop into the auger trough, the transverse auger pushes the crop along the axis of the transverse auger. Once the corn crop reaches the center of the corn head, it must be redirected into the feeder house opening. However, as the flightings push the corn ears into the center of the corn head, the corn flow gains momentum. The corn ears from the right side of the corn head and the left side of the corn head impact at the corn head center. Frequently some of the corn ears are pushed to the opposing side of the corn head, flipped over the top of the transverse auger or thrown out of the corn head altogether. Several approaches have been taken to minimize the loss of the corn ears. First, the rate at which the corn crop is cut can be reduced, thus limiting the corn entering the corn head to manageable rate. However, this increases the length of harvesting operations. Second, several fingers have been inserted onto the transverse auger in front of the opening to the feeder house. These fingers push the crop into the feeder house. However, these fingers can damage the corn ears. Attempts to minimize the contact of the fingers on the corn ears have resulted in many patents.

The prior art illustrates these and additional difficulties. U.S. Pat. No. 3,503,190 discloses a harvesting machine with a corn head having two portions which pivot around a center 'elongated' element. The portions are designed to be folded at the pivot during transport. Unfortunately, it is necessary to maintain duplicate drive mechanisms for the transverse auger and there is no provision for a row divider used on the existing corn heads.

U.S. Pat. No. 3,794,046 discloses a header crop divider for an axial flow combine having side-by-side axial flow units. A cutting means 68 is affixed to the transverse auger 62. Channel members with a knife section 70, 72 and 74 are affixed to the corn head trough. These knives cut the crop as it approaches the center of the corn head. The main drawback to this approach is that it damages the crop. Further this approach has a limited ability to redirect the flow of corn crop towards the feeder house opening.

U.S. Pat. No. 3,244,271 discloses an auger for axially moving and laterally discharging material. The transverse auger has a two cone portions located at the auger's center. The cones restrict the crop flow and force the flow into the feeder house opening. However, modifying the transverse auger is costly, also the crop is damaged by the cones. Further, such an approach may be ineffective for corn ears.

U.S. Pat. No. 4,617,787 discloses a combine harvester machine and head with several conveyors for pushing the crop into the auger trough. This mechanism is mechanically complex. Further it is unclear whether the design can accommodate the row dividers of a corn head. Also the dividers into this device are actually the covering of the conveyor mechanism.

Consequently, the need exists for a corn head which can ensure the smooth flow of corn ears from the auger trough into the feeder house opening.

OBJECTS OF THE INVENTION

It is an object of the present invention to provide a corn head auger trough divider which can smoothly alter the flow of corn ears traveling in the auger trough and into the feeder house opening.

It is a further object of the present invention to provide an auger trough divider which can be easily and inexpensively installed onto an existing corn head trough.

It is a further object of the present invention to provide an auger trough divider which can conform to the curved contours of an existing corn head trough.

It is a further object of the present invention to provide an auger trough divider which can be installed behind the row divider of a conventional corn head.

It is a further object of the present invention to provide an auger trough divider which can be installed in front of the feeder house opening and beneath the center of the transverse auger.

It is a further object of the present invention to provide a two piece auger trough divider which consists of a front divider and rear divider.

It is a further object of the present invention to provide a front divider which re-orients the flow of the corn crop from traveling along the axis of the transverse auger axis to flowing into the feeder house opening.

It is a further object of the present invention to provide an auger trough divider which divides the corn crop equally for threshing in a twin rotor harvesting combine.

It is a further object of the present invention to provide a means for altering the flow of corn ears without having an attachment to the transverse auger.

SUMMARY OF THE INVENTION

The invention overcomes the deficiencies of the prior art. The invention provides a corn head auger trough divider. The divider is located between the center row divider and the center of the feeder house opening. The divider is affixed beneath the transverse auger and does not contact the auger flighting. The divider consists of two parts—a front divider and rear divider which are contoured to the curve of the auger trough. The front divider is directly behind the center row divider and has a top region which is triangularly shaped. The creates a pair of side embankments which the corn crop contacts. This shifts the flow of corn crop from travelling along the axis of the transverse auger to directly into the feeder house opening. The rear divider is partially nested beneath the front divider.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
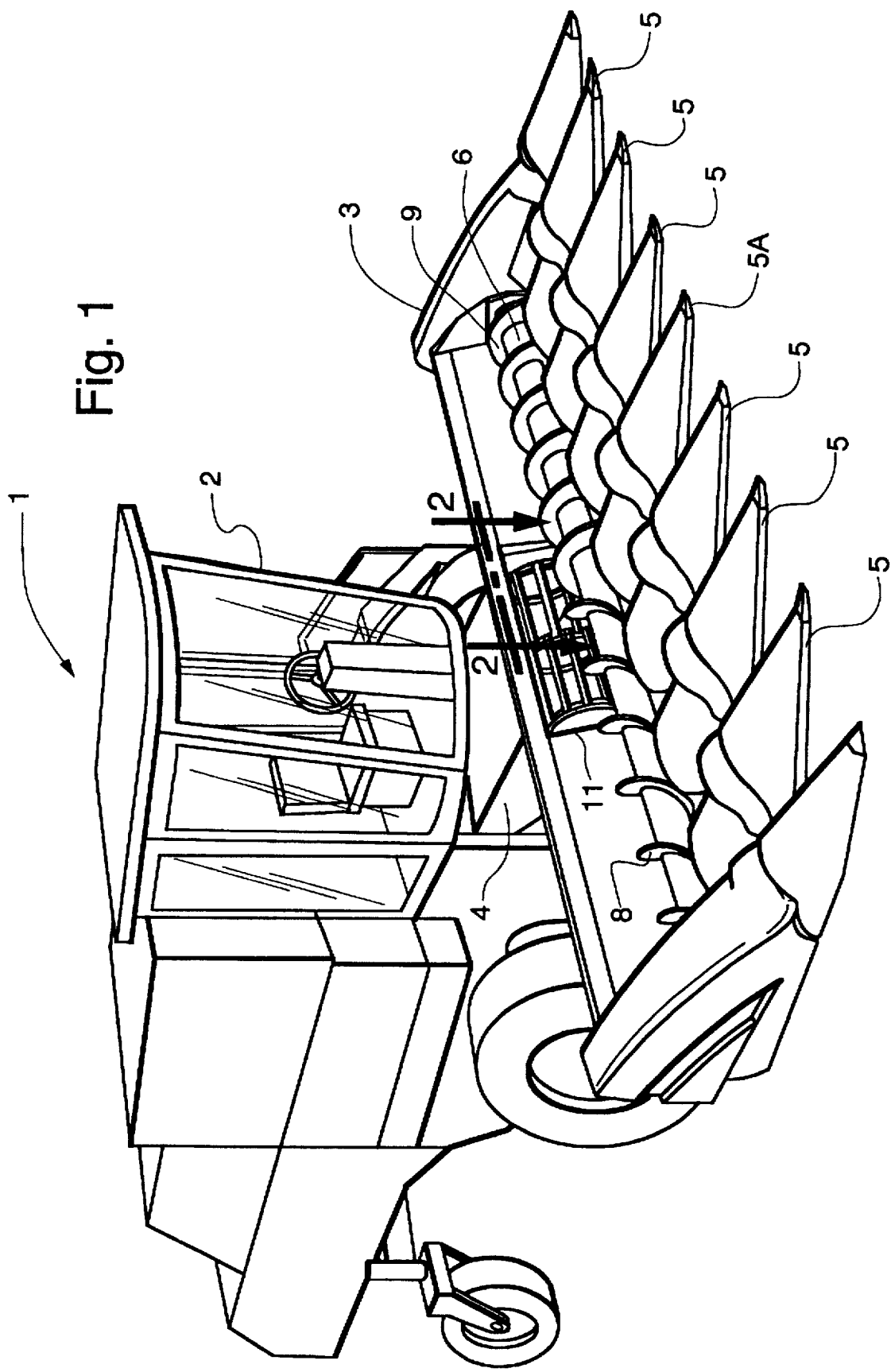
FIG. 1 is a general view of a corn harvester combine with a corn head containing the present invention.
Figure 2:
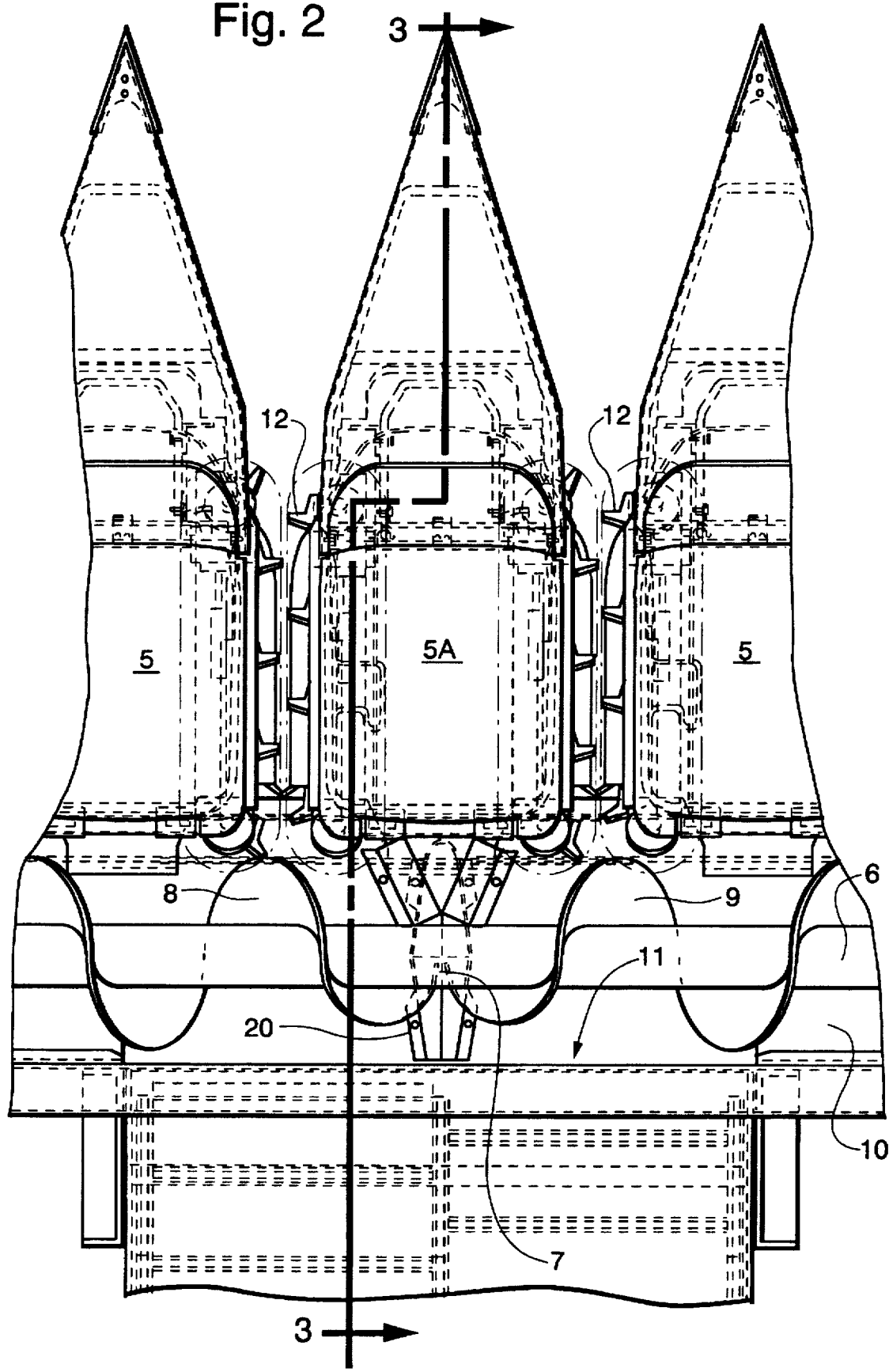
FIG. 2 is an enlarged overhead view taken along line 2—2 of FIG. 1 showing the corn head auger trough, feeder house opening, the row divider and auger trough divider.
Figure 3:
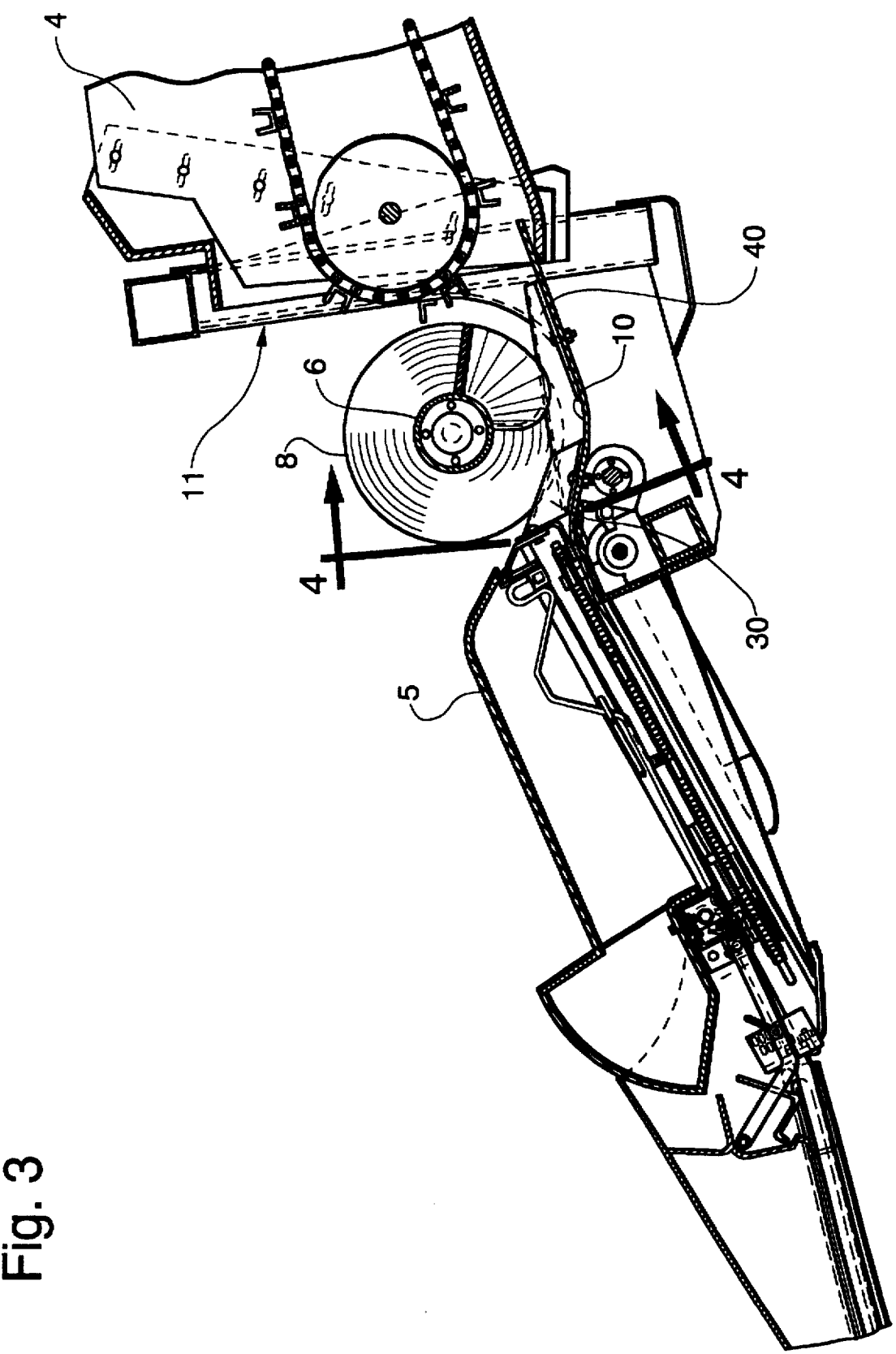
FIG. 3 is an enlarged sectional side view taken along line 3—3 of FIG. 2 showing the auger trough, feeder house opening, the row divider and auger trough divider.
Figure 4:
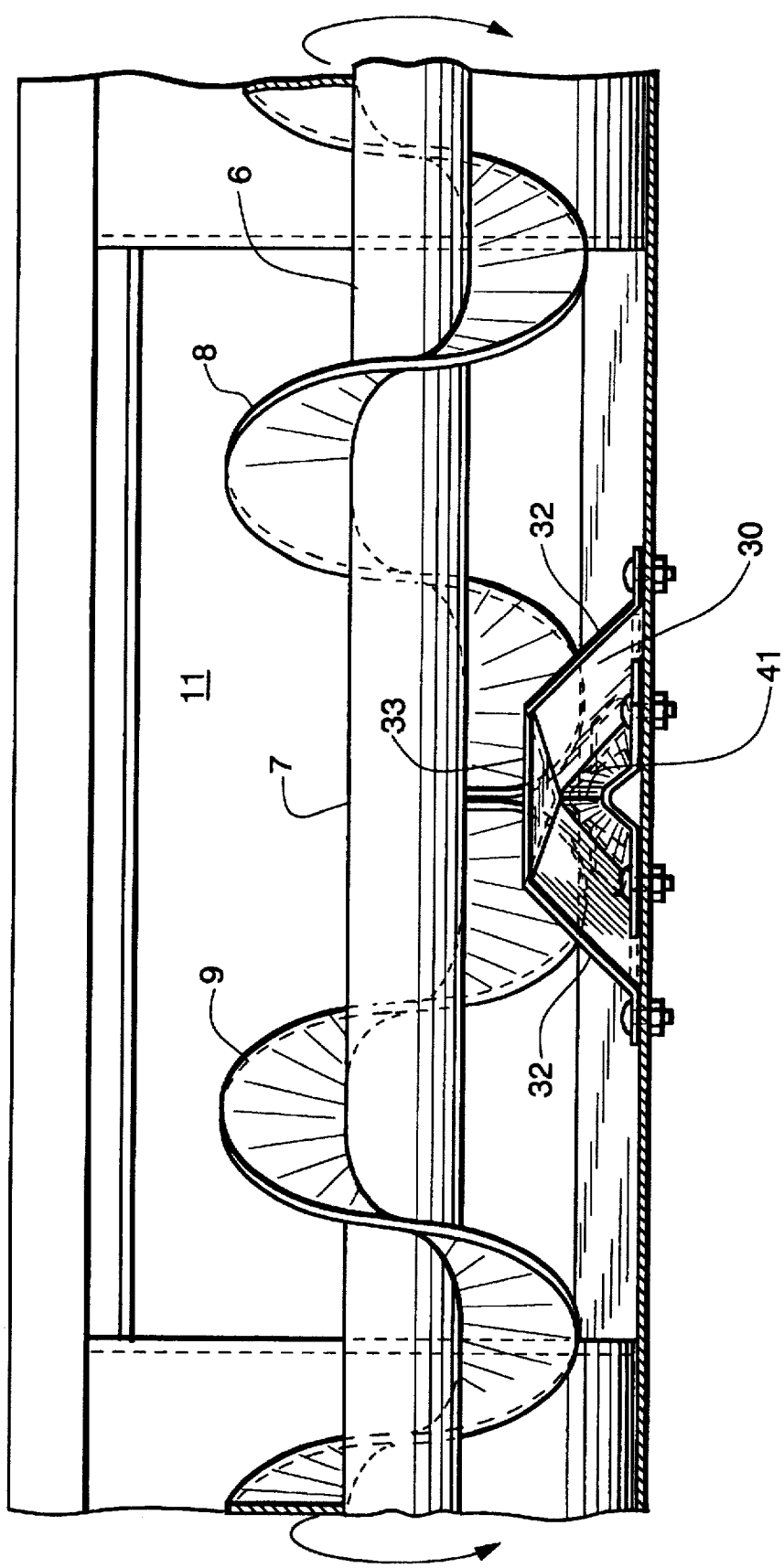
FIG. 4 is an enlarged sectional view taken along line 4—4 of FIG. 3 showing the front divider, transverse auger and auger trough.
Figure 5:
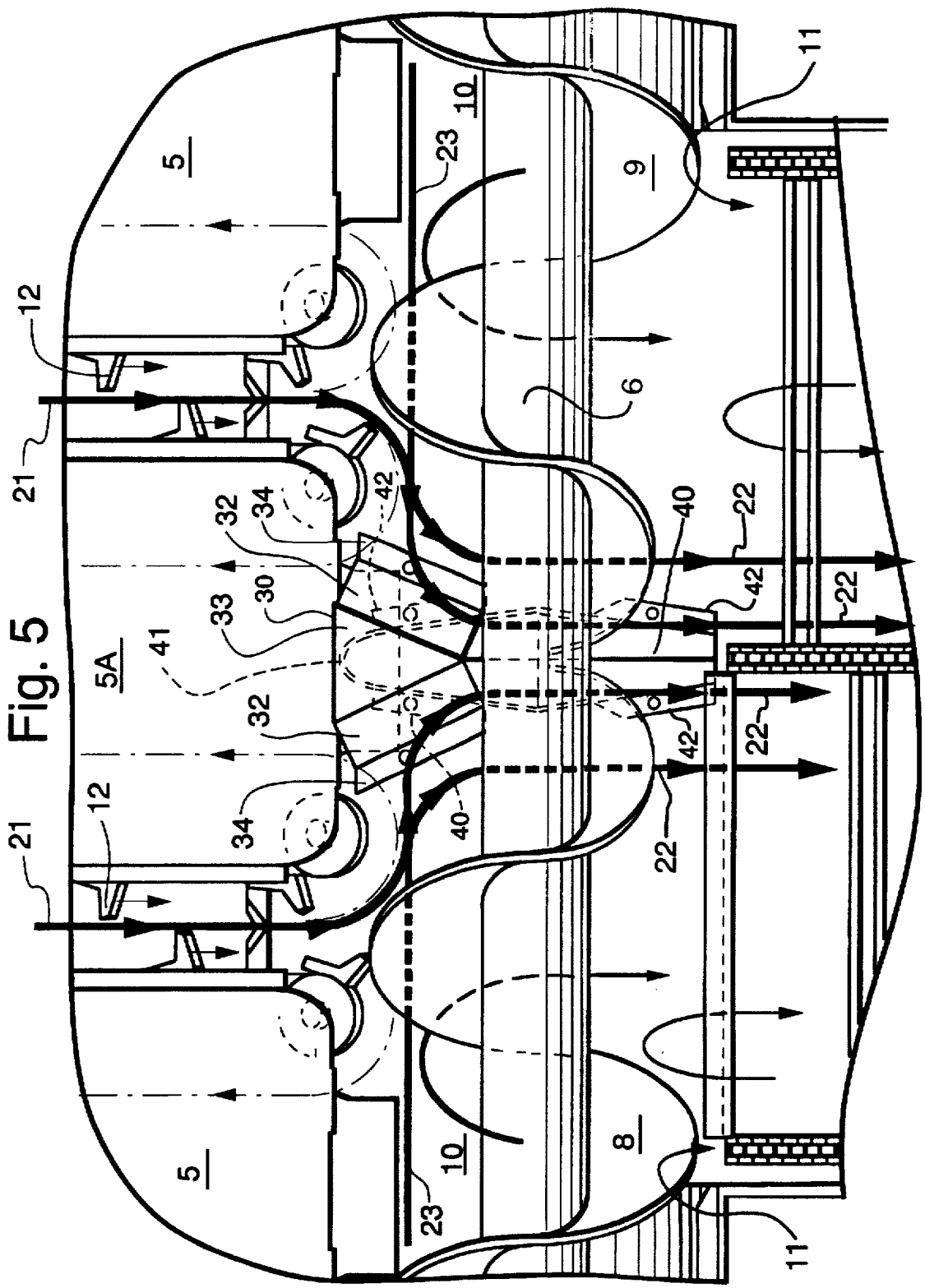
FIG. 5 is an enlarged overhead view showing the flow of the corn crop from the gathering chains to the feeder house opening.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

The invention is located on the corn head 3 of a corn harvester or combine 1. FIG. 1 illustrates a conventional twin rotor combine. Typically, there is a corn head 3 attached by the feeder house 4 or elevator to a combine 1. The row dividers 5 move between rows of corn and the corn stalks are drawn rearward by a front auger and then cut by the stalkroll. The gathering chains 12 feed the ear of corn backwards 21 and into the auger trough 10. The transverse auger 6 with a left-handed flighting 8 and a right-handed flighting 9 is located above the auger trough 10. The transverse auger flighting (8 or 9) moves the corn into the center of the corn head to the feeder house opening 11. The ears of corn are moved through the feeder house into a threshing system located in the combine 1. The corn kernels are then separated from the ear. The kernels of corn are then moved and stored in a grain tank located at the top of the combine. These are discharged later. The chaff or trash is discharged from the rear of the combine 1. An operator drives the combine from a glass cab 2 with a chair and steering column. From the cab, the operator can observe most of the corn head 3 and combine 1 functions.

The present invention 20 is located at the center 7 of the corn head 3 within 5 the auger trough 10 (sometimes referred to as the header floor). The divider 20 is positioned in front of the feeder house opening 11 and behind the center row divider 5a. The divider 20 is designed to re-orient the transverse grain flow 23 to a rearward grain flow 22. A rearward grain flow 22 results in a more effective entrance of the crop into the feeder house opening 11.

The divider 20 actually consists of two elements—a front divider 30 and a rear divider 40. The rear divider 40 extends the width of the auger trough 10. The base of the rear divider 40 is contoured to fit in the auger trough 10. There are four rear tabs 42 which can be altered to match the slope of the auger trough 10. There are openings in each rear tab 42 allowing a fastener to be inserted and attach the rear is divider 40 to the auger trough 10. The rear divider 40 is placed beneath the transverse auger 6. The flighting 8 or 9 at the center of the transverse auger 6 may be trimmed or reduced so as to not contact the top of the rear divider 40. The rear divider 40 is centered directly behind the center row divider assembly 5a. The rear divider also is centered on the feeder house opening 11. This location splits the crop flow evenly. The crop from the left side of the corn can flow into the left side of the feeder house opening 11. In a twin rotor combine, the crop from the left side will be threshed and separated by the left rotor. Likewise the crop from the right side of the corn head is processed by the right rotor. This helps ensure a more balanced distribution of the crop throughout the entire threshing system.

The front divider 30 is located just behind the center row divider 5a. A portion of the rear divider 40 is nested 41 within the front divider 30. The front divider 30 has two front tabs 34 at its' base. The tabs 34 are used to fasten the front divider 30 to the auger trough 10. Again, the tabs 34 are designed to match the contour of the auger trough 10. The top region 33 is triangularly shaped and is generally positioned horizontal to the ground. Attached to the top region 33 are a pair of rectangularly shaped side embankments 32. The side embankments 32 are generally positioned vertically relative to the ground. The side embankments 32 turn the flow of crop 23 from travelling along the transverse auger axis to travel directly 22 ('rearward travel') into the opening of the feeder house 11. Again, like the rear divider 40, the front divider 30 do not contact the flighting 8 or 9 on the transverse auger 10. Also, the front divider 30 is centered on feeder house opening 11.

In operation, the corn head 3 passes over a row of corn crop. The processing equipment within the row divider 5 cuts and removes the ear from the corn stalk. The gathering chains 12 then push the corn ears 21 into the auger trough 10. The flighting 8 or 9 on the transverse auger 6 move the corn ears into the center of the corn head 7. The corn ears first contact the side embankment 32 of the front divider 30. The corn ear then continues towards the rear divider 40 and into the feeder house opening 11. The feeder house 4 then carries the corn ears into the threshing and separating rotors within the combine 1.

The present invention is designed to be used in conjunction within an auger trough of a conventional corn head. However, the divider could be installed on similar configurations.

It will be obvious to those skilled in the art that various changes may be made without departing from the scope of the invention and the invention is not to be considered limited to what is illustrated in the drawings and described in the specification.

What is claimed is:

1. In a corn head operationally attached to a combine by a feeder house, said corn head having a plurality of row dividers, each row divider extending forward of an auger trough said row divider containing a stalkroll, a stripper plate, a gathering chain and a gear box, said corn head also having a transverse auger with a left handed flighting and a right handed flighting, said auger cooperating with the auger trough to move a flow of corn crop to the feeder house, the improvement comprising a divider Generally perpendicularly affixed to the trough between the row divider and the feeder house, said divider located beneath the transverse auger and between the left handed flighting and right handed flighting, wherein the divider further comprises a rear divider partially nested within a front divider, said front divider affixed behind a center row divider, whereby a flow of crop material is changed by the divider so as to enter the feeder house in a rearward manner.

2. The improvement described in claim 1, wherein the front divider further comprises a triangularly shaped top region and a plurality of rectangularly shaped side embankments, each said side embankment affixed to the top region.

3. The improvement described in claim 2, wherein the top region is generally horizontal and the side embankment is generally vertical, whereby the corn crop flows into the side embankment and is directed in the feeder house.

4. A corn head auger trough crop divider for a corn head on a corn harvester, comprising:

a. a corn head operationally connected to a combine by a feeder house, said corn head having a trough, a row divider and a transverse auger;

b. a divider affixed to the trough between the row divider and the feeder house and below the transverse auger; and c. said divider having a rear divider partially nested within a front divider, whereby a transverse crop flow contacts the divider and is shifted into a rearward crop flow which enters the feeder house.

5. The corn head auger trough crop divider as defined in claim 4, wherein the transverse auger has a left-handed flighting and right-handed flighting, said flighting for moving the transverse crop flow to a center of the transverse auger, said flighting and said auger not contacting the divider.

6. The corn head auger trough crop divider as defined in claim 5, wherein the trough is curved, and said divider corresponds to the curve.

7. The corn head auger trough crop divider as defined in claim 6, wherein the rear divider further comprises of a plurality of rear tabs, wherein each rear tab is affixed to the auger trough.

8. The corn head auger trough divider as defined in claim 7, wherein there are four rear tabs.

9. The corn head auger trough crop divider as defined in claim 8, wherein the front divider further comprises a top region, said top region being triangularly shaped.

10. The corn head auger trough crop divider as defined in claim 9, wherein the top region is generally horizontal.

11. The corn head auger trough crop divider as defined in claim 10, wherein the front divider further comprises a plurality of side embankments, each side embankment affixed to the top region, and each side embankment is generally rectangularly shaped.

12. The corn head auger trough divider as defined in claim 11, wherein the side embankment further comprises a plurality of front tabs each front tab being affixed to the auger trough.

13. The corn head auger trough divider as defined in claim 12, wherein there are two front tabs.

14. The corn head auger trough divider as defined in claim 13, wherein the side embankment is generally vertical.

15. The corn head auger trough crop divider as defined in claim 14, wherein the said divider is only used on a corn head which has an even number of row dividers.

16. The corn head auger trough crop divider as defined in claim 15, wherein the divider is positioned between a center row divider and a center of the feeder house opening.

17. A crop divider for a corn head having a trough and a transverse auger with flighting, said corn head operationally connected to a harvester by a feeder house, comprising said divider affixed to the trough said divider further comprises a rear divider partially nested within a front divider whereby a flow of grain is directed into the feeder house and whereby the divider does not contact said auger and said divider does not contact said flighting.

* * * * *